United States Patent
Boulanger et al.

(10) Patent No.: US 7,734,776 B2
(45) Date of Patent: *Jun. 8, 2010

(54) AUTOMATICALLY DETECTING MALICIOUS COMPUTER NETWORK RECONNAISSANCE BY UPDATING STATE CODES IN A HISTOGRAM

(75) Inventors: Alan D. Boulanger, Amherst, MA (US); Robert W. Danford, Carrboro, NC (US); Kevin D. Himberger, Raleigh, NC (US); Clark D. Jeffries, Durham, NC (US); Raj K. Singh, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 67 days.

This patent is subject to a terminal disclaimer.

(21) Appl. No.: 12/040,065

(22) Filed: Feb. 29, 2008

(65) Prior Publication Data

US 2008/0148406 A1    Jun. 19, 2008

Related U.S. Application Data

(63) Continuation of application No. 10/629,175, filed on Jul. 29, 2003, now Pat. No. 7,356,587.

(51) Int. Cl.
G06F 15/173 (2006.01)
G06F 11/00 (2006.01)
G06F 12/14 (2006.01)
G06F 12/16 (2006.01)
G08B 23/00 (2006.01)

(52) U.S. Cl. ............................ 709/224; 726/23
(58) Field of Classification Search ......... 709/223–229; 726/23
See application file for complete search history.

(56) References Cited

U.S. PATENT DOCUMENTS

| 5,038,343 A | 8/1991 | Lebizay et al. |
| 5,774,660 A | 6/1998 | Brendel et al. |
| 5,841,520 A | 11/1998 | Taniguchi |
| 5,968,176 A | 10/1999 | Nessett et al. |

(Continued)

FOREIGN PATENT DOCUMENTS

JP    61010348 A    1/1986

(Continued)

OTHER PUBLICATIONS

Transmission Control Protocol; RFC 793; Sep. 1981.*

(Continued)

*Primary Examiner*—Benjamin R Bruckart
(74) *Attorney, Agent, or Firm*—Patrick J. Daugherty; Driggs, Hogg, Daugherty & Del Zoppo Co., LPA

(57) ABSTRACT

A detection and response system that generates an Alert if unauthorized scanning is detected on a computer network that includes a look-up table to record state value corresponding to the sequence in which SYN, SYN/ACK and RST packets are observed. A set of algorithms executed on a processing engine adjusts the state value in response to observing the packets. When the state value reaches a predetermined value indicating that all three packets have been seen, the algorithm generates an Alert.

14 Claims, 9 Drawing Sheets

U.S. PATENT DOCUMENTS

| | | | |
|---|---|---|---|
| 6,088,804 | A | 7/2000 | Hill et al. |
| 6,279,113 | B1 * | 8/2001 | Vaidya .................. 726/23 |
| 6,321,338 | B1 | 11/2001 | Porras et al. |
| 6,381,215 | B1 | 4/2002 | Hamilton et al. |
| 6,487,666 | B1 | 11/2002 | Shanklin et al. |
| 6,693,700 | B2 | 2/2004 | Shima |
| 6,792,546 | B1 | 9/2004 | Shanklin et al. |
| 6,826,699 | B1 | 11/2004 | Sun |
| 7,073,198 | B1 * | 7/2006 | Flowers et al. .......... 726/23 |
| 7,076,803 | B2 | 7/2006 | Bruton et al. |
| 7,114,182 | B2 | 9/2006 | Robert et al. |
| 7,191,468 | B2 | 3/2007 | Hanner |
| 7,284,272 | B2 | 10/2007 | Howard et al. |
| 2003/0101353 | A1 | 5/2003 | Tarquini et al. |
| 2003/0145233 | A1 | 7/2003 | Poletto et al. |
| 2003/0165160 | A1 | 9/2003 | Minami et al. |
| 2003/0236995 | A1 | 12/2003 | Fretwell, Jr. |
| 2004/0098617 | A1 | 5/2004 | Sekar |
| 2004/0146063 | A1 | 7/2004 | Golshan et al. |
| 2004/0250124 | A1 | 12/2004 | Chesla et al. |
| 2004/0250127 | A1 | 12/2004 | Scoredos et al. |
| 2007/0143846 | A1 * | 6/2007 | Lu .................. 726/23 |

FOREIGN PATENT DOCUMENTS

| | | |
|---|---|---|
| JP | 10233358 | 9/1998 |
| JP | 10247618 A | 9/1998 |
| TW | 477140 B | 2/2002 |
| TW | 484282 B | 4/2002 |
| WO | 9822875 | 5/1998 |

OTHER PUBLICATIONS

N. Kato et al., "A Real Time Intrusion Detection System (IDS) for Large Scale Networks and Its Evaluations", IEICE Trans. Commun., Vo. E82-B, No. 11, Nov. 1999, pp. 1817-1825.

Marco de Vivo et al., "A Review of Port Scanning Techniques" ACM Digital library, 1999/2000.

PCT International Search Report and Written Opinion dated Aug. 30, 2004 re application Serial No. PCT/EP2004/050968 of International Business Machines Corporation.

Search Report for Taiwan Invention Patent Application No. 093119477, Dec. 26, 2008.

* cited by examiner

200

300

400

600

900

| 0 | 4 | 8 | 16 | 19 | 31 |
|---|---|---|---|---|---|
| Version | IHL | Type of Service | Total Length ||| 
| Identification ||| Flags | Fragment Offset ||
| Time To Live || Protocol | Header Checksum |||
| Source IP Address ||||||
| Destination IP Address ||||||
| Options ||||| Padding |

TCP Header Format

AUTOMATICALLY DETECTING MALICIOUS COMPUTER NETWORK RECONNAISSANCE BY UPDATING STATE CODES IN A HISTOGRAM

RELATED APPLICATION

This application is a continuation of application Ser. No. 10/629,175, filed Jul. 29, 2003.

BACKGROUND OF THE INVENTION

1. Technical Field

The present invention relates to computer networks in general and, in particular, to an intrusion detection system that protects such networks from malicious attacks launched by hackers.

2. Prior Art

The worldwide web (WWW) better known as the Internet is fast becoming the premier computer network for communicating both private and public information. The Internet is an open network that can be accessed by anyone using primarily a protocol called TCP/IP (Transmission Control Protocol/Internet Protocol) or other protocols. Because of its openness computers on private networks (intranets) are susceptible to malicious attacks by hackers. Computers have become the main instrument of communication for business and government agencies. For example, many business and government agencies use computers and computer networks to link remote offices, share data and other resources among employees within an office or campus, communicate with customers via electronic mail, reach new customers via electronic mail, provide information via web sites, etc.

Because businesses, governments and individuals rely heavily on computers and the Internet malicious attacks could result in catastrophic economic loss or embarrassment. As a consequence computer security has become a major concern of business, government and individuals using the computer as a major communication vehicle.

There are several ways in which hackers may elect to inflict malicious attacks on computers. One way is to disrupt computers' operation by disseminating programs that take unauthorized control of a computer's operating system. Another way is to discover confidential information about assets in the computer or a subnet in the network for the purpose of deleting data, modifying date and/or copying data. Any of these actions could adversely affect a home, business, or governmental agency network.

To carry out these attacks a hacker or attacker may wish to obtain information by corrupting a normal Transmission Control Protocol (TCP) session-opening handshake. In this regard, the attacker may initiate a TCP session by sending a Synchronize (SYN) packet from User Space (that is, User as opposed to Kernel mode in the Operating System). The resulting SYN packet is not different from legitimate traffic; so it will pass firewalls and be accepted by the victim or scanned host, if the TCP Destination Port is open (that is, the host is programmed to reply to TCP SYN packets arriving with the given port number). Therefore, open ports on the scanned host will reply with a TCP packet with both the SYN and Acknowledgment (ACK) bits in the TCP header set (equal to 1 as opposed to 0). This reply is called a SYN/ACK. A port that is not programmed to respond is called closed, and typically the host will respond with a TCP packet in which the Reset (RST) bit has been set. Upon receiving a RST response, the attacker will typically record (possibly with automatic software freely available on the Internet) the fact that a given TCP port at a given Internet Protocol (IP) Destination Address is closed, or simply do nothing. However, if there is a SYN/ACK response from the victim, the attacker will know that he has found an open port that may be susceptible later to an actual attack. To try to avoid detection by some logging tools and suspicion by the victim host, the attacker might immediately responds with a RST packet. Another reason to respond with a RST quickly is to ensure that the victim's computer does not crash due to an excessive number of half-open connections. In doing so the attacker does no damage to the scanned computer and can continue to scan, thereby fulfilling the goals of attacker reconnaissance. At the same time, the goals of the subnet administrator include avoiding release of information about open ports and applications running in the subnet.

The prior art has recognized the importance of computer networks and has provided intrusion detection systems to protect them from hackers. Examples of prior art intrusion detection systems can be found in U.S. Pat. Nos. 6,477,651; 6,363,489; 6,405,318; 6,275,942; 5,991,881 and 6,282,546. Even though the respective intrusion detection systems described in each of the patents works well for its intended purpose, for the most part most require the insertion of a marker into the network traffic in order to detect surreptitious activities, such as scanning, or reconnaissance in the network. In several situations it may be difficult to use the marker. Therefore, an alternate technique to detect scanning reconnaissance is desirable.

SUMMARY OF THE INVENTION

It is believed that most unauthorized entries are done in two stages, namely: reconnaissance and attack. During the reconnaissance stage information about computers is gathered. The gathered information is used in the attack stage to disrupt computing activities.

The present invention detects unauthorized users or scanning during the reconnaissance stage and takes corrective action set forth herein. In particular, the present invention uses detection of a predefined sequence of TCP packets to determine that the network is being scanned.

In accordance with the present invention, network traffic is monitored to detect a triplet (3) of packets flowing between a Source Address (SA) and a Destination Port (DP). The SA can be the 32-bit value of Internet Protocol version 4 (IPv4) or the 128-bit value of Internet Protocol version 6 (IPv6). The triplet of packets are: SYN, SYN/ACK and RST. Once the triplet of packets is detected in the stated sequence, the SA associated with these packets is identified as that of the hacker. Even though these packets are legitimate TCP/IP packets, they are not expected to be seen in the stated sequence (triplet). Therefore, their presence is used to identify the source originating the SYN and RST packets and receiving the SYN/ACK packet as the hacker.

The detection mechanism includes a look-up table having a plurality of locations. Each location is provided with a Source Address (SA) slot in which SA is written and a two-bit indicator slot for recording state information. The state information relates to the order in which the triplets TCP/IP packets SYN, SYN/ACK and RST are seen at the monitoring point in the network. In the specific embodiment 00 indicates initial or default state; 01 indicates SYN packet; 10 indicates SYN/ACK packet; and 11 indicates RST packet. The 11 state is the alarm state in which an administrator is notified that a specific source Address is engaged in reconnaissance. In addition, other preventative measures may be taken.

A look-up device (including a general processor or specialized processor, such as an IBM PowerNP network processor, executing algorithms discussed herein) dynamically adjusts state and/or SA information in the table to select and report SA having the 11 state condition. In addition, the algorithm uses a hash of the four-tuples (SA, DA, SP, DP) of a received packet, called a key, to access the table for a SYN or RST packet. A hash of the reflection of the four-tuples (SA, DA, SP, DP) (the reflection being defined in the invention as the four-tuple (DA, SA, DP, SP) obtained from the original SYN packet (SA, DA, SP, DP)) is used for the SYN/ACK packet.

Further features and advantages of the invention as well as the structure and operation of various embodiments of the invention are described in detail below with reference to the accompanying figures.

DETAILED DESCRIPTION OF EMBODIMENTS

Figures 7, 9:
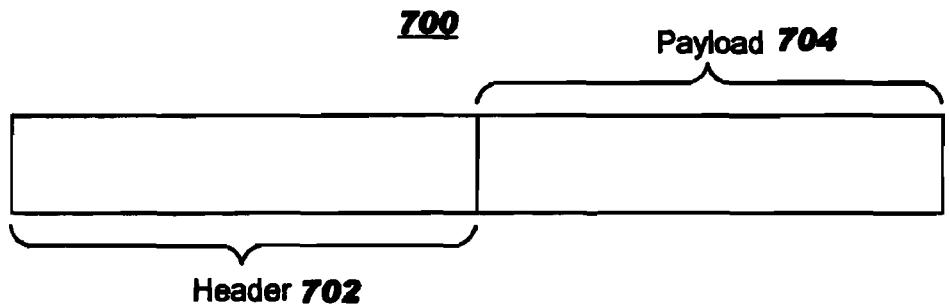
FIG. 7 shows a format for TCP/IP packet.
FIG. 9 shows a graphical representation of the IP header format.

FIG. 7 shows a graphical representation of TCP/IP packet or frame 700 which includes a header portion 702 and a payload section 704. The TCP/IP format is well known in the prior art. Therefore, only the portion of the format which relates to the present invention will be discussed herein. The portion of the format which is relevant to the present invention is the header 702. The header section 702 includes both a TCP header and IP header.

Figure 8:
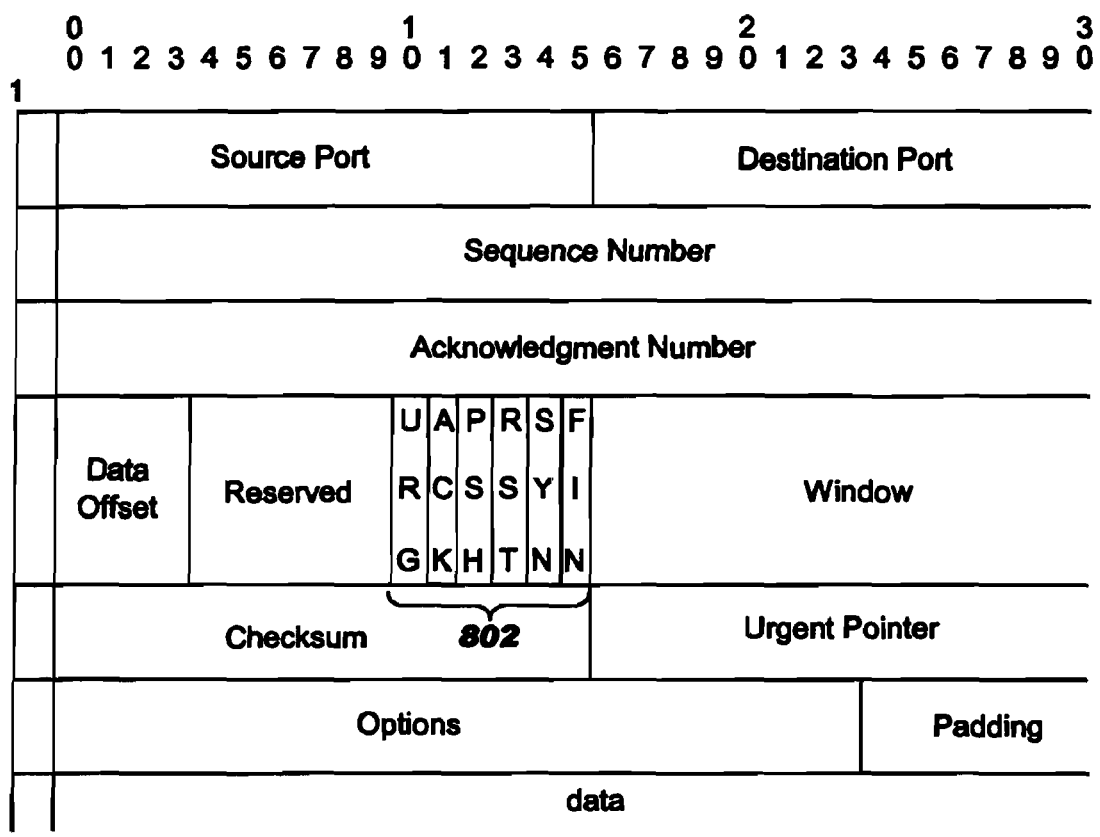
FIG. 8 shows a graphical representation of the TCP Header Format.

FIG. 8 shows TCP format 800. The TCP format 800 is well known in the prior art. Therefore, only the portions or fields of the header that are of interest to the present invention will be discussed herein. The relevant fields of the TCP format are: Source Port (16 bits), Destination Port (16 bits) and control 802. The control 802 is a set of six 1-bit flags that can be set to identify the type of packet that is being transmitted. The three flags of interest to the present invention are SYN, RST and SYN/ACK. For example, if the packet is a SYN packet which would be generated by a device, on the network, that wishes to establish a TCP/IP session, the SYN field would be set to a 1. Likewise, if the packet is a SYN/ACK packet which is usually returned as a response to a SYN packet, the acknowledge (ACK) bit and the SYN bit would be set to 1 and so forth.

FIG. 9 shows format 900 for the IP portion of the header. Similar to the other header format, the IP format is well known in the prior art. Therefore, only the fields in the header that are relevant to the present invention will be described. The fields of interest are Source IP Address (32 bits) and Destination IP Address (32 bits). The concatenation SA, DA, SP and DP is known as the four-tuple of the TCP packet. According to the teachings of the present invention the four-tuple is fed to a hash function and the hashed values are used as location to index into a histogram or look-up structure, to be discussed hereinafter for a SYN packet or RST packet. A reflection of the four-tuple (SA, DA, SP, DP) is also hashed in part of the invention and the hashed value used as location index into the look-up structure.

In addition to using the four-tuples and their reflection, the present invention monitors the network to detect a sequence of TCP/IP packets. The presence of these three packets might indicate reconnaissance activities on the network. The three packets are all TCP/IP packets occurring in the following order (D1, D2 and D3):

D1. The first packet is a TCP SYN packet. Its Source Address (SA), Destination Address (DA), Source Port (SP), and Destination Port (DP) are recorded in the four-tuple (SA, DA, SP, DP).

D2. The second packet is a TCP SYN/ACK packet. Its four-tuple consists of the same field values as the first packet but in the reflected order (DA, SA, DP, SP).

D3. The third packet is a TCP RST packet. Its four-tuple consists of the same field values of the first packet and in the same order as in the first packet, that is, (SA, DA, SP, DP).

Figure 10:
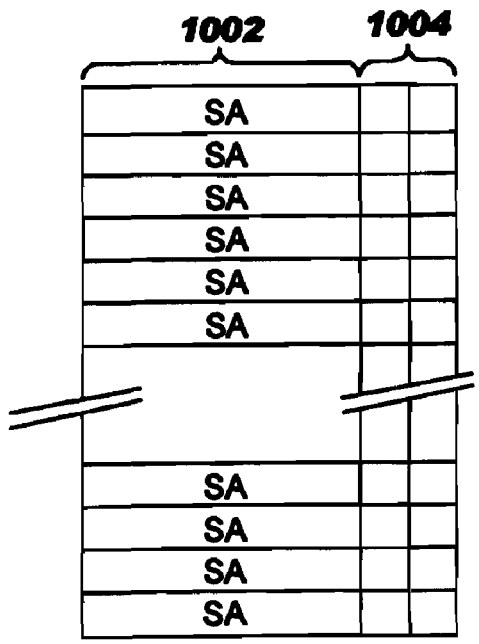
FIG. 10 shows a graphical representation of the look-up or histogram table according to the teachings of the present invention.

FIG. 10 shows look-up structure or look-up table or histogram 1000 according to the teachings of the present invention. Histogram 1000 is used to track the occurrence and order of the triplets on the network. Histogram 1000 includes section 1002 in which source addresses (SA) of devices such as a computer connected to the network are recorded and section 1004 a 2-bit code field for recording state information is concatenated to the first section. The code bits are used to track triplets that are used to indicate illegal scanning if detected in relationship to the same source address (SA). In particular, 00 represents a default condition; 01 represents that a SYN packet has been observed; 10 indicates a SYN/ACK packet has been seen and 11 indicates an alarm condition; the third of the triplet has been seen. In addition, the SYN and RST packets must originate from the same source address and the SYN/ACK packet must be a response to the SYN packet from the same source address. When all three packets have been seen relevant to the same source address then an alarm indicating that illegal scanning is being conducted on the network is initiated.

Figure 1:
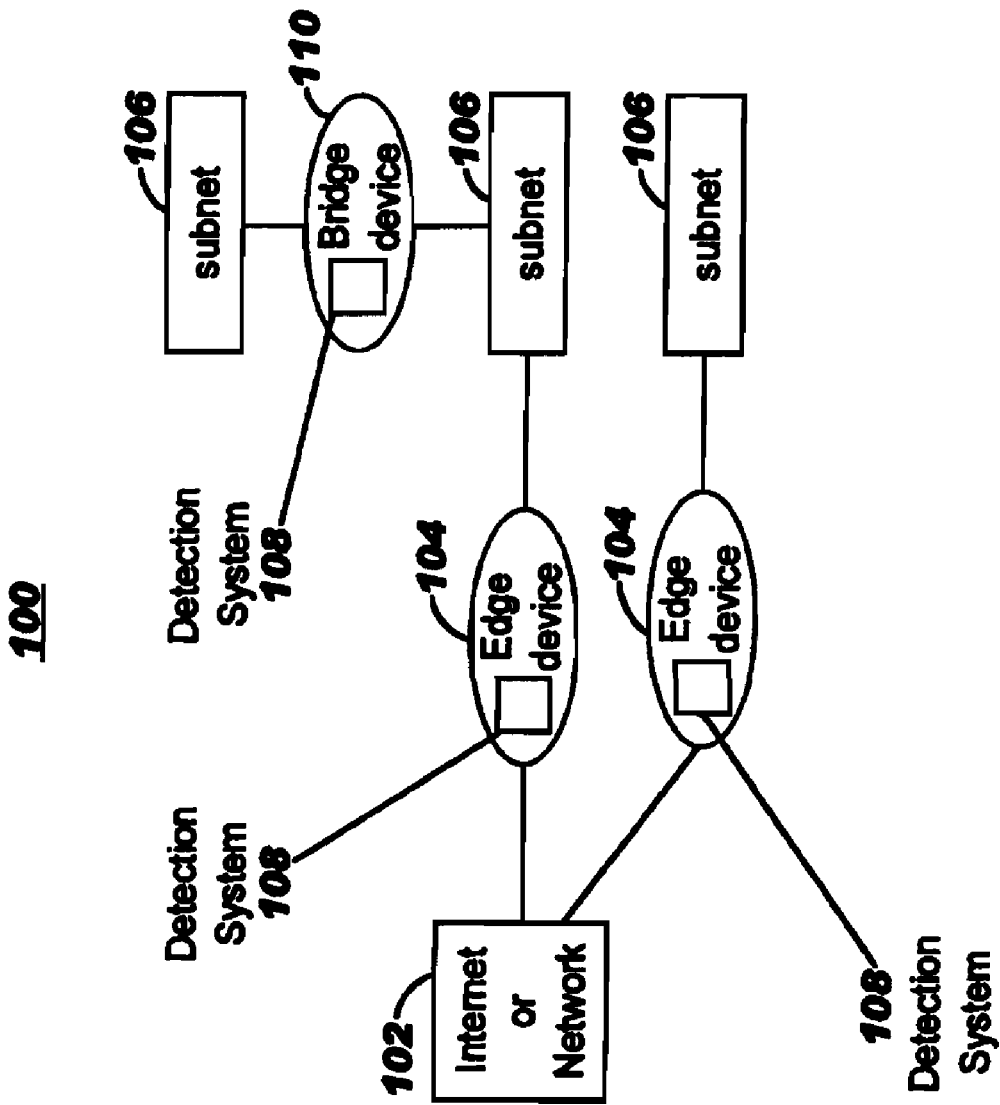
FIG. 1 shows high level block diagram of a network and in particular some potential logical locations to position the present invention as detection mechanism.

FIG. 1 shows a highly simplified network 100 in which the detection system 108 of the present invention could be implemented. The Internet or other network 102 connects to Edge devices 104. Each edge device might or might not contain an instance of the detection system 108. Edge devices also connect subnets 106. In turn, two subnets might be connected by a Bridge device 110. A Bridge device might or might not contain an instance of the detection system 108. Because Edge devices, subnets and Bridge devices are well known in the prior art, further discussion of these entities will not be given.

Figure 11:
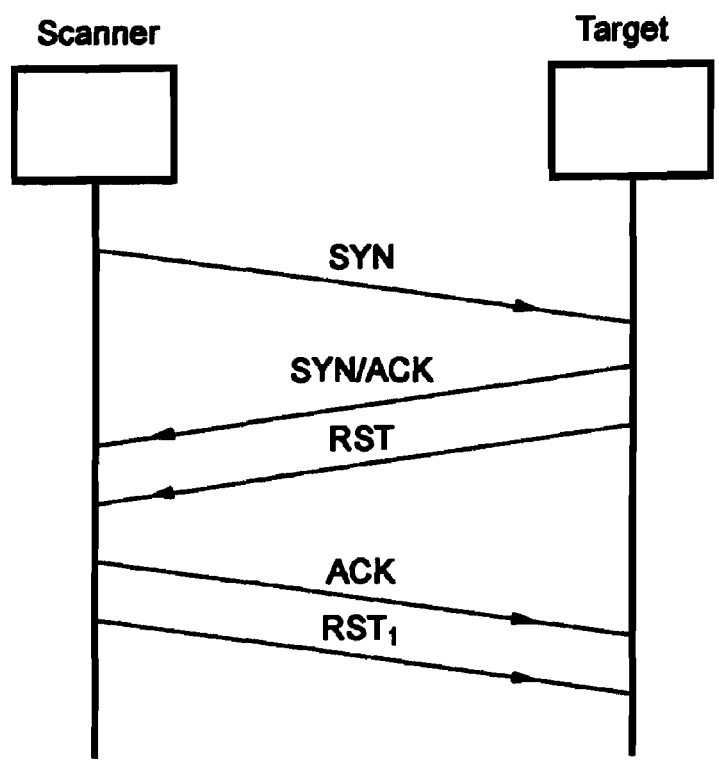
FIG. 11 shows IP flows of packets exchanged between a scanner and a target.

Turning to FIG. 11 for the moment, a graphical representation of two network devices operable positioned in the network of FIG. 1 is shown. The device labeled "scanner"

represents the hacker or device which is scanning to gather information from the device labeled "target". The device labeled "target" includes the detection mechanism of the present invention. The flows or packets that are exchanged between the scanner and target are labeled and the direction of the flow is shown by the arrow. In order to gather the information the scanner generates and issues the first of the triplets labeled SYN which is forwarded to the target. The target seeing the SYN packet issues a SYN/ACK packet to the scanner which issued the original SYN packet. On receiving the SYN/ACK packet the scanner would issue the packet labeled RST1. This sequence of packet SYN, SYN/ACK and RST1 when detected in the recited sequence by the detection device in the target would very likely indicate that malicious scanning is being conducted in the network. The preventative measures set forth herein is practiced once this illegal sequence of packets are observed. It should be noted that if the scanner was a legitimate device on the network, then after receiving SYN/ACK from the target it would issue the flow labeled Acknowledge (ACK). The flow's SYN, SYN/ACK and ACK are legitimate TCP handshaking signals that are exchanged in order to establish a legitimate session between stations on the network. The description so far assumes that the port on the target through which the packets are exchanged are open. However, if a port or ports on the target are closed then that port would issue the packet labeled "RST".

Figure 2:
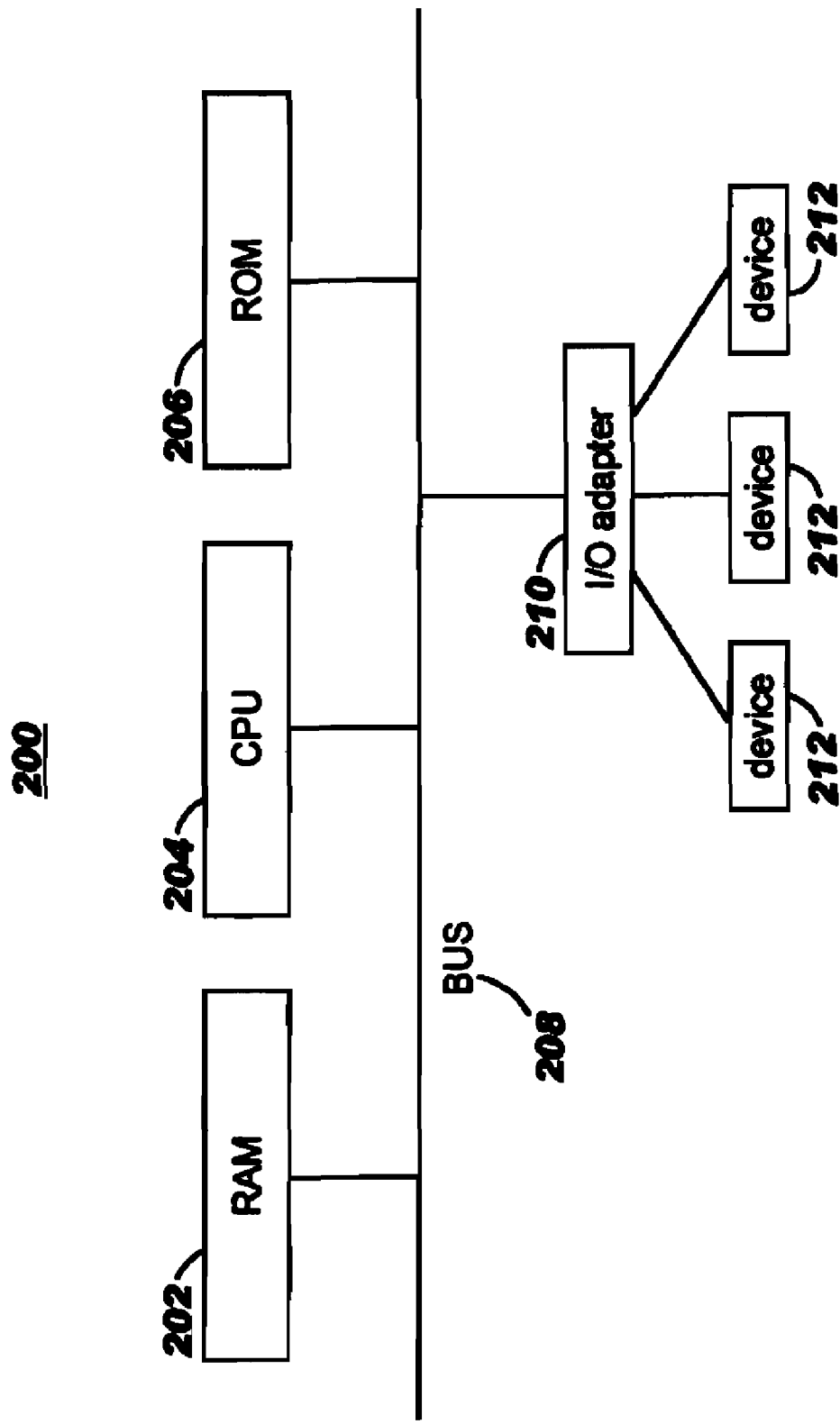
FIG. 2 shows high level block diagram of components needed to implement the present invention.

FIG. 2 shows a block diagram for one embodiment of hardware used in detection system 200 which is labeled 108 in FIG. 1. Random Access Memory (RAM) 202 stores updates of information as included in the present invention. A Central Processing Unit (CPU) 204 has access to data stored at configuration in a computer-readable medium (the Read Only Memory (ROM) 206) to implement the algorithms of the present invention set forth herein and thereby update RAM. A Bus 208 is provided for communication of signals among the components. An Input/Out put (I/O) adapter 210 manages signaling to and from external devices 212. The I/O adapter 210 might include a general purpose computer with monitor observed periodically by a human administrator. One of the devices 212 could be a device such as an adapter that detects packets on the network and forwards the packets to the CPU for further processing according to teachings of the present invention.

In an alternate embodiment one of the device 212 could be a special purpose computer such as the PowerNP developed and marketed by IBM. The PowerNP is a network processor that includes an Embedded Processor Complex (EPC) containing a plurality of processors that performs the necessary function to enable routing of a packet within a network. The PowerNP also includes storage in which the histogram according to the teachings of the present invention could be stored. In addition, the algorithms described herein could be executed in the EPC. A more detailed description of the PowerNP is set forth in U.S. Pat. No. 6,404,752 which is incorporated herein in its entirety.

The intrusion detection system of the present invention also includes algorithms which are described below. Before describing the algorithms several features of the invention that are used by the algorithms will be discussed. Let us defined the four-tuples of any TCP packet as the concatenation consisting of the IP Source Address (SA) (32-bit or 128-bit, depending upon application of the invention to IPv4 or IPv6 ), the IP Destination Address (DA) (again, 32-bit or 128-bit)we, the 16-bit TCP Source Port (SP), and the 16-bit TCP Destination Port (DP) in the order: (SA, DA, SP, DP). Let the reflection of the four-tuple (SA, DA, SP, DP) be defined by (DA, SA, DP, SP). Note that the traffic in the two directions of a TCP session consist precisely of some frames with a given four-tuple and other frames (in the opposite direction) with a four-tuple that is the reflection of the first four-tuple. Next let us define a reflect hash function to be defined as a mathematical map from the space of all possible four-tuples (96 bits) to the space of the same number of bits. The reflect hash applied to (SA, DA, SP, DP) yields (DA, SA, DP, SP), that is certain source and destination fields of both IP and TCP headers have been interchanged.

In general, a lookup mechanism is any system or method that can record the experience of seeing a four-tuple, record an administratively-determined action for that arriving four-tuple at the first time it is encountered, and can reapply the same action for the same four-tuple (or a related action for the reflection of the four-tuple) if it is encountered again. A lookup mechanism in a preferred embodiment will also have some mechanism for erasing from finite memory the record of those four-tuples and their actions that have not been encountered for a prolonged interval of time.

A lookup mechanism in the present invention takes the given four-tuple as a key to find a leaf. Each leaf contains the full SA of the key and a State values that is 0=Default, 1, 2, or 3=ALERT (the same State values can of course appear in the form of binary numbers, namely, 00, 01, 10, and 11). Thus the input of the lookup is 96 bits and the output of the lookup is 32 bits for SA and 2 bits for State. The present invention includes the following DETECTION and PURGE algorithms.

Figure 3:
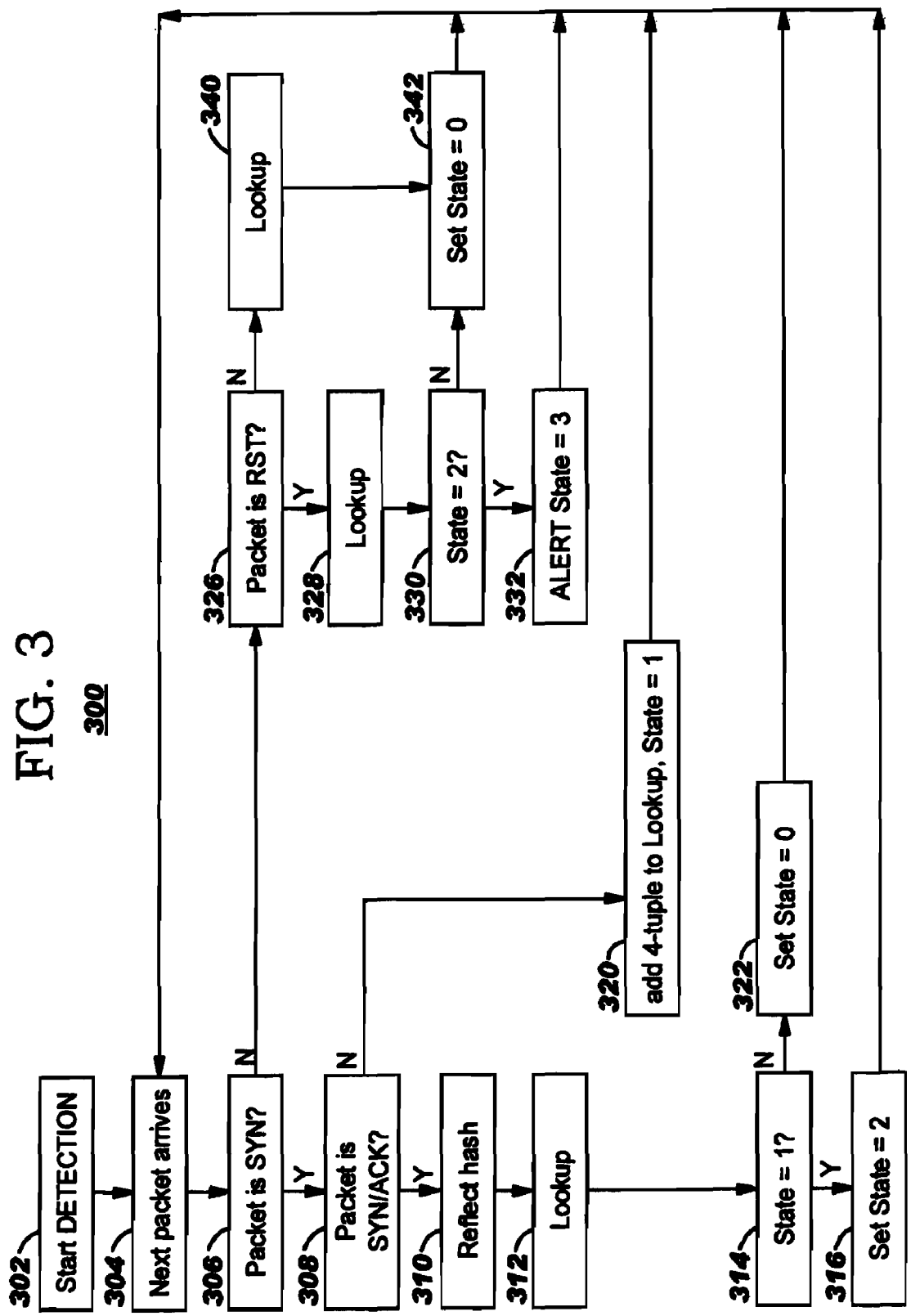
FIG. 3 shows a flowchart for the DETECTION algorithm of the present invention.

Referring to FIG. 3, a flowchart is shown for the DETECTION algorithm included in the invention. As stated herein the algorithm can be efficiently executed in the PowerNP discussed above. In particular the algorithm is executed on the EPC (Embedded Processor Complex) shown in FIG. 1 of U.S. Pat. No. 6,404,752 and incorporated herein by reference. The algorithm could also be executed on CPU 204. The start 302 of the algorithm is followed by the arrival of the next packet 304. The Internet Protocol (IP) packet is tested 306 for being SYN. If it is, then it is further tested 308 for being SYN/ACK packet. If it is, then the four-tuple is fed to the reflection hash 310 discussed herein. The reflected hash value is used in the lookup 312 that is done in look-up structure 1000 (FIG. 10). The State is tested 314 for being 1. If it is 1, then the State is set 316 to 2. Next the system returns to the next packet arrival 304. If in 314 the State is not 1, then the State is set to 0, 322. Next the system returns to the next packet arrival 304. In 308, if the packet is not SYN/ACK, then the algorithm branches to 320. The four-tuple of the packet leads to creation of an entry in look-up structure 1000 labeled by the hash value. The entry contains the full SA and the State, which is set to 1. Next the system returns to the next packet arrival 304. If in 306 the packet is not SYN, then the packet is tested 326 for being RST. If the packet is RST, then the packet is sent to the Lookup 328 that is done in look-up structure 1000 (FIG. 10). The state associated with the lookup is tested 330. If the State is 2, then State is set to 3, the ALERT State 332. This triggers a RESPONSE, described below. Next the system returns to the next packet arrival 304. If in 330 the State is not 2, then the State is set to 0, 342. Next the system returns to the next packet arrival 304. If in 326 packet is not RST, then the packet is fed to lookup 340. Then the State is set to 0, 342. Next the system returns to the next packet arrival 304.

An alternate representation of the detection algorithm is set forth in TABLE I. The steps 1 through 15 are self-explanatory. Therefore, further description is not warranted.

1TABLE I DETECTION Algorithm 1. A packet arrives 2. If the packet is not a TCP SYN packet, then goto 10. 3. If the packet is not SYN/ACK, then goto 8. 4. Feed the four-tuple in the packet to the reflect hash. 5. Lookup the reflected four-tuple and find its State. 6. If the State is not 1, then set the State=0 and goto 1. 7. Set the State=2 and goto 1. 8. In the Lookup mechanism, add the four-tuple with SA and State=1 in leaf. 9. Goto 1. 10. If the packet is not RST, then goto 14. 11. Lookup the four-tuple. 12. If the State is not 2, then set State=0 and goto 1. 13. A SYN, SYN/ACK, RST triplet has been observed, set State=3 and goto 1. 14. Lookup the four-tuple. 15. Record the State as 0 and goto 1.

Figure 4:
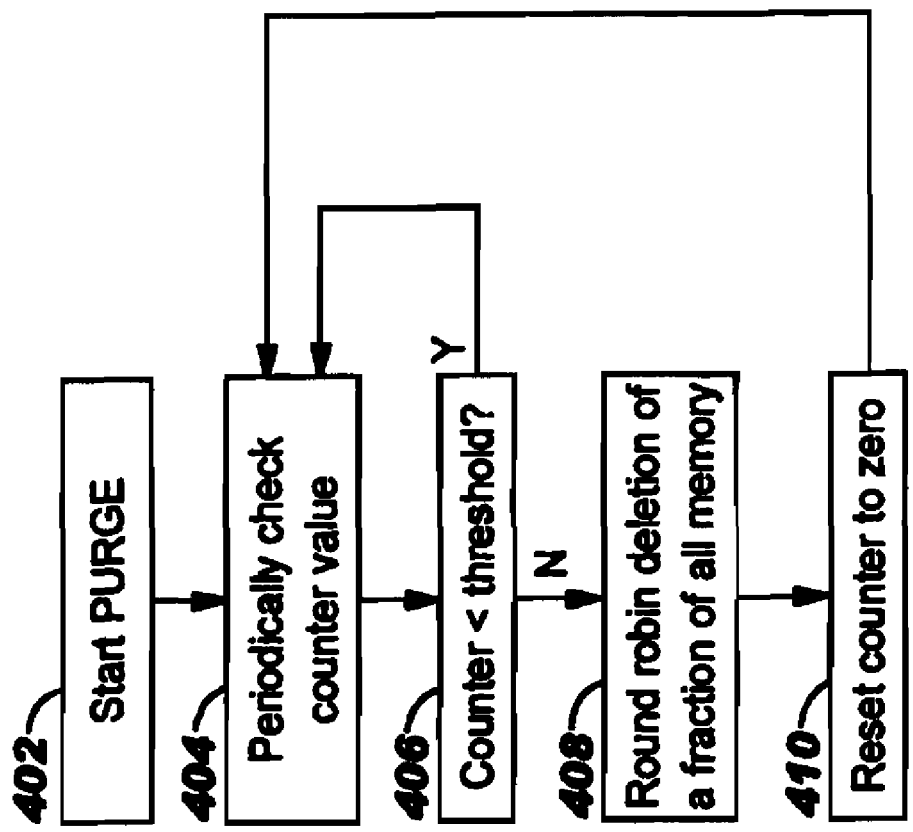
FIG. 4 shows a flowchart for the PURGE algorithm by which the memory used in the present invention is periodically purged.

Referring to FIG. 4, a flowchart 400 is shown for the PURGE algorithm included in the invention. The purge algorithm periodically deletes old information from memories in a reasonable time such as 16 seconds that is larger than typical three-way TCP handshake duration. Typical values for Purge interval would be one or ten seconds. The start 402 of PURGE leads to continuous running of a counter. It is periodically checked 404 for its value relative to a threshold. If comparison 406 shows the value is less than the threshold, then the system returns to await another periodic check. If comparison 406 shows the value is greater than or equal to the threshold, then a certain fraction of memory such as {fraction (1/16)} is completely erased 408. The erasure is done in round robin manner among fractions of memory. Next the counter is reset to zero 410. Next the system returns to 404 to await periodic checking of the counter value. The counter would be scaled so that the overall Purge interval might be about one or ten seconds.

An alternate representation of the Purge Algorithm is shown in TABLE II. The steps 1 through 5 of the Purge Algorithm is self-explanatory. Therefore, further description is not warranted.

2TABLE II PURGE Algorithm 1. Periodically check the value of a continuously running counter. 2. If the value of the counter is less than a threshold, goto 1; else goto 3. 3. Delete a fraction such as {fraction (1/16)} of all memory entries (occupied slots and leaf SA, State values). 4. Reset the counter value to zero. 5. Goto 1.

Figure 5:
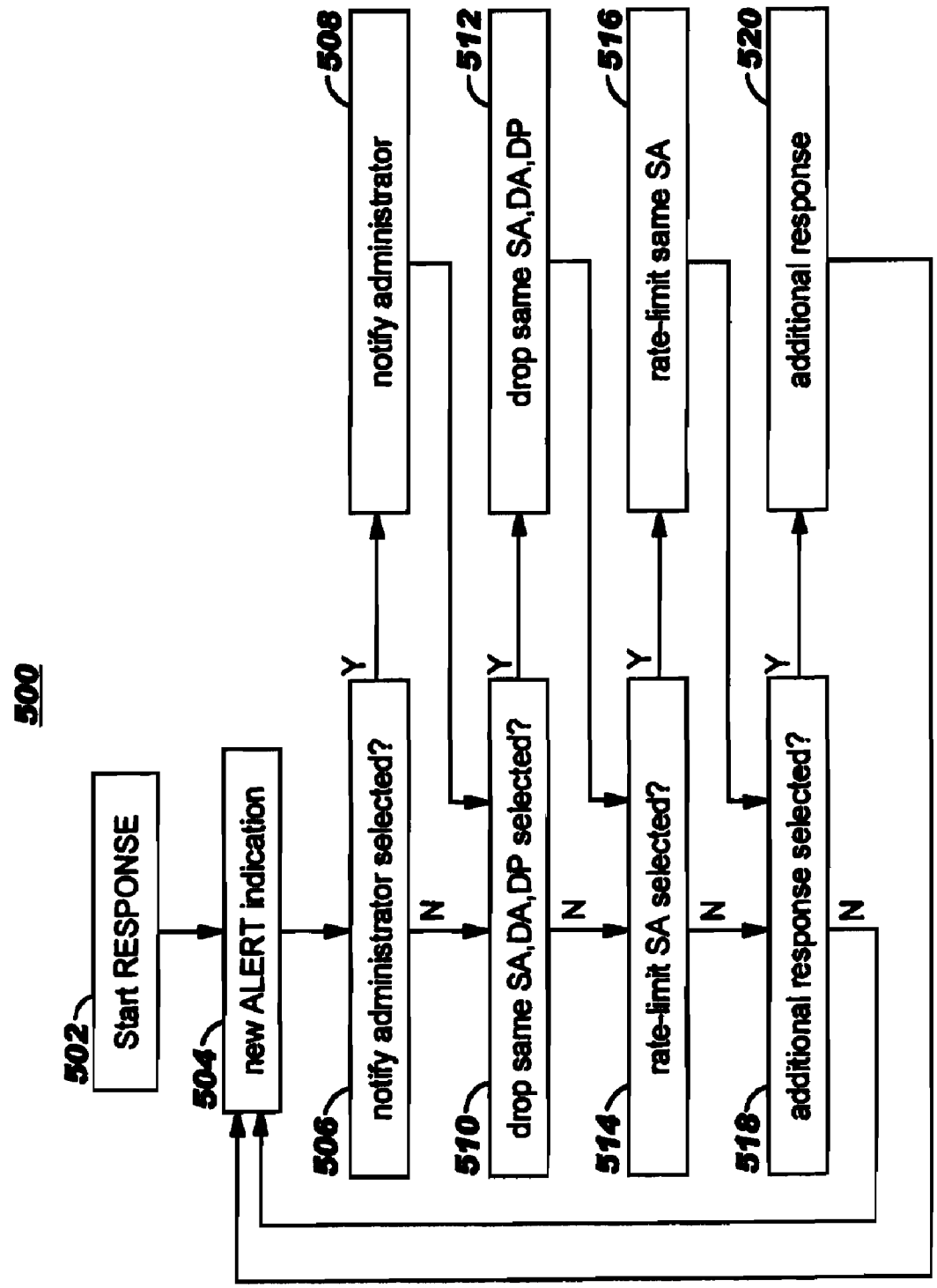
FIG. 5 shows a flowchart of actions to be taken in responding to an ALERT indication.

Referring to FIG. 5, flowchart 500 for the RESPONSE to the ALERT (FIG. 3) is shown. The invention includes several possible options for a RESPONSE when the ALERT pointer is newly set. RESPONSE starts 502 and awaits an ALERT indication. When an ALERT pointer arrives 504, the invention determines 506 by configuration whether or not a message is to be sent to an administrator. If yes, then the message is sent 508. In either event, the invention next determines 510 by configuration whether or not future packets with the same SA, DA, DP are to be blocked. If yes, then blocking process is initiated 512. In either event, the invention next determines 514 by configuration whether or not the flow of future packets with the same SA is to be rate-limited. If yes, then rate-limiting process is initiated 516. In either event, the invention next determines 518 by configuration whether or not some additional response measure is to be taken. If yes, then additional measure is initiated 520. In either event, the system returns 504 to await the next ALERT indication.

Figure 6:
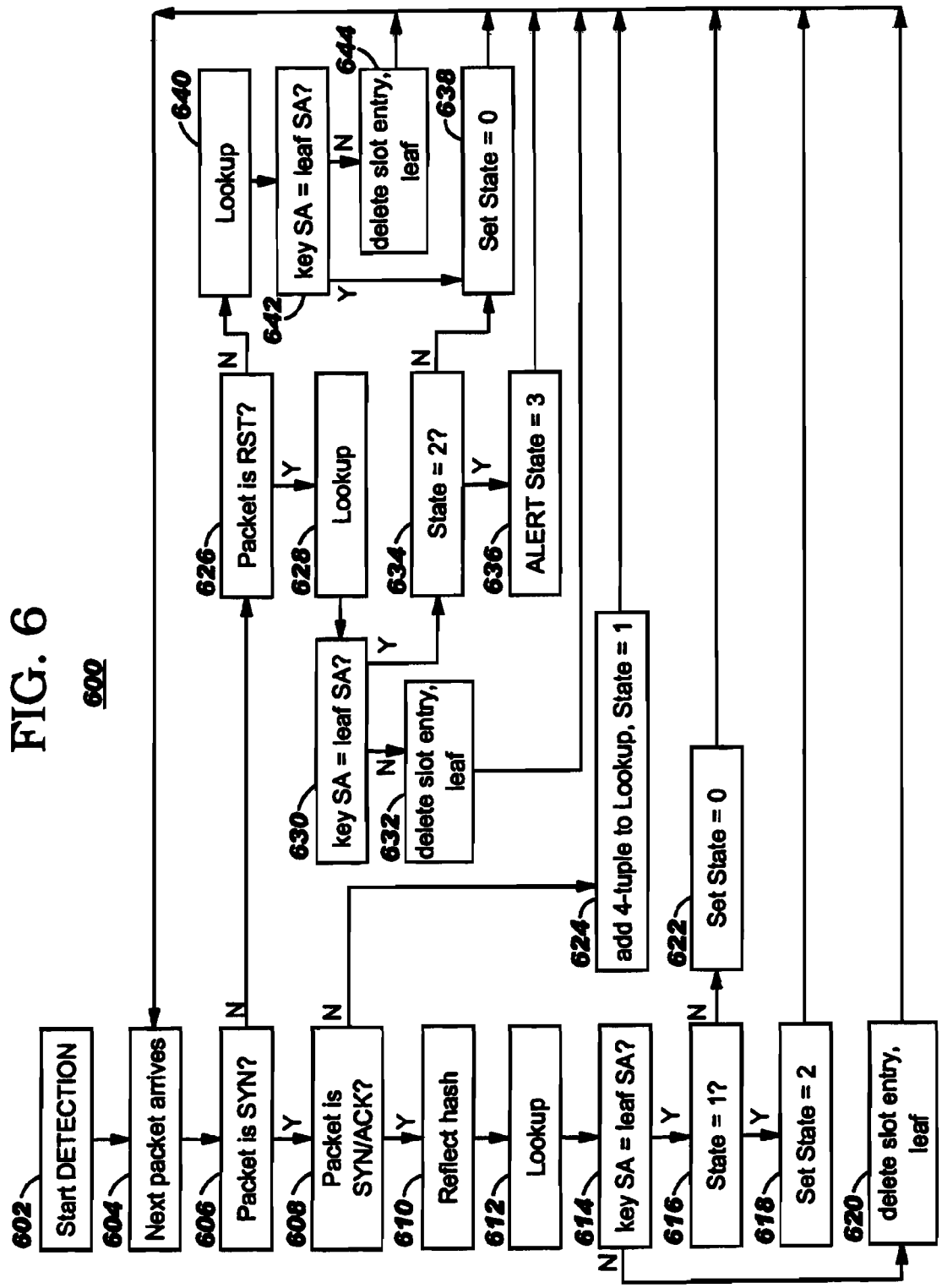
FIG. 6 shows a flowchart for the DETECTION Algorithm with SA Check, an alternative embodiment of the present invention.

Referring to FIG. 6, a flowchart 600 is shown for the DETECTION Algorithm with SA Check, as may be used in an alternative embodiment of the present invention to reduce the likelihood of false positive ALERTs. In this alternate embodiment the lookup mechanism includes a direct table with each location of the table regarded as a leaf. The start 602 of the algorithm is followed by the arrival of the next packet 604. The packet is tested 606 to see if it is a SYN packet. If it is, then it is further tested 608 for being SYN/ACK. If it is, then the four-tuple is fed to the reflection hash 610. The reflected hash value is used in the Lookup 612. To provide look-up 612 the reflected hashed value is used as an index to access a location in the look-up table in FIG. 10. The key SA and the leaf or location SA are compared 614. If they are not equal, then delete the slot entry and leaf 620. Next the system returns to the next packet arrival 604. If in 614 the key SA and the leaf SA are equal, then the State is compared to 1, 616. If the State is 1, then the State is set 618 to 2. Next the system returns to the next packet arrival 604. If in 616 the State is not 1, then the State is set to 0, 622. Next the system returns to the next packet arrival 604. In 608, if the packet is not SYN/ACK, then the algorithm branches to 624. The four-tuple of the packet leads to creation of a leaf labeled by the hash value. The leaf contains the full SA and the State, which is set to 1, 624. Next the system returns to the next packet arrival 604. If in 606 the packet is not SYN, then the packet is tested 626 for being RST. If the packet is RST, then the packet is sent to the Lookup 628. The Lookup compares 630 the key SA and the leaf SA. If they are not equal, then delete the slot entry and leaf 632. Next the system returns to the next packet arrival 604. If the key SA and the leaf SA are equal, then the State of the packet is compared to 2, 634. If the State is 2, then State is set to 3, the ALERT State 636. This triggers a RESPONSE, described herein. Next the system returns to the next packet arrival 604. If in 634 the State is not 2, then the State is set to 0, 638. Next the system returns to the next packet arrival 604. If in 626 packet is not RST, then the packet is fed to Lookup 640. Next the key SA and the leaf SA are compared 642. If they are equal, then the State is set to 0, 638. Next the system returns to the next packet arrival 604. If in 642 the key SA and the leaf SA are not equal, then delete the slot entry and leaf 644. Next the system returns to the next packet arrival 604. This concludes the detailed description of the present invention.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teaching and advanced use of this invention. Accordingly, all such modifications are intended to be included within the scope of this invention as defined in the claims.

The invention claimed is:

1. An intrusion detection system, comprising:
   a memory device comprising a table containing a state code; and
   a processing means in communication with the memory device, the processing means configured to examine received packets flowing within computer network communications and increment the memory device state code in response to observing each of a predefined sequential triplet of TCP/IP protocol packets, the predefined sequential packet triplet comprising an initial SYN packet originating from a source address, a next sequential SYN/ACK packet issuing from a target device address in response to the SYN packet, and a last sequential RST packet originating from the source address in response to the SYN/ACK packet, each of the packets comprising a source address field, a target device address field, a source port field and a target device port field;
   wherein the processing means is configured to:
      dynamically update a memory device histogram by concatenating a source address field, a target device address field, a source port field and a target device port field of a packet of the predefined sequential triplet into a histogram table field as an ordered four-tuple;
      hash the ordered four-tuple; and use the hashed ordered four-tuple as a histogram location index; and wherein the processing means is configured to issue an alert if the predefined sequential triplet packet is detected, the predefined sequential triplet packets are each relevant to the source address and the incremented state code reaches a predefined alert value.

2. The intrusion detection system of claim 1 wherein the processor means includes a programmed general purpose computer, a programmed specialized computer or a network processor.

3. The intrusion detection system of claim 2 wherein the processor means is further configured to detect the predefined sequential packet triplet by:

concatenating source address, target device address, source port and target device port fields of the SYN packet in a source address-target device address-source port-target device port first order four-tuple and initializing the state code field;

concatenating source address, target device address, source port and target device port fields of the SYN/ACK packet in a reflection of the first order in a target device address-source address-target device port-source port reflected order four-tuple and incrementing the initialized state code field; and concatenating source address, target device address, source port and target device port fields of the RST packet in a first order four-tuple and incrementing the incremented state code field into the alert value.

4. The intrusion detection system of claim 3 wherein the processor means is further configured to purge the state code field upon a lapse of a purge time period.

5. The intrusion detection system of claim 4 wherein the processor means is further configured to detect a next sequential predefined sequential packet triplet SYN/ACK packet by matching a look-up table key source address to a SYN/ACK packet source address field.

6. The intrusion detection system of claim 5 wherein the processor means is further configured to block future packets comprising the source address, the target device address and a target device port address.

7. The intrusion detection system of claim 5 wherein the processor means is further configured to rate-limit flows of packets comprising the source address.

8. A program product including:

a computer-readable medium; and a computer program recorded on said medium, said computer program including a set of instructions that, when executed on a computer, causes the computer to:

define a table in a memory means containing codes whose values represent detection of each of a predefined sequential packet triplet and at least one source address associated with at least one of the codes, each of the predefined sequential triplet packets comprising a source address field, a target device address field, a source port field and a target device port field;

monitor packets flowing on a computer network;

dynamically update a histogram in the memory means by concatenating a source address field, a target device address field, a source port field and a target device port field of a packet of the predefined sequential packet triplet into a histogram table field as an ordered four-tuple; hashing the ordered four-tuple; and using the hashed ordered four-tuple as a histogram location index; and issue an alert if the predefined sequential triplet packet is detected, the predefined sequential triplet packets are each relevant to the source address and the incremented state code reaches a predefined alert value;

wherein the predefined sequential packet triplet comprises an initial SYN packet originating from the source address, a next sequential SYN/ACK packet issuing from a target device address in response to the SYN packet, and a last sequential RST packet originating from the source address in response to the SYN/ACK packet.

9. The program product of claim 8 further including a second set of instructions which, when executed on the computer, causes the computer to issue the alert by generating a message notifying an operator of an occurrence of an event.

10. The program product of claim 9 further including a third set of instructions which, when executed on the computer, causes the computer to detect the predefined sequential triplet by:

concatenating source address, target device address, source port and target device port fields of the SYN packet in a source address-target device address-source port-target device port first order four-tuple and initializing a state code;

concatenating source address, target device address, source port and target device port fields of the SYN/ACK packet in a reflection of the first order in a target device address-source address-target device port-source port reflected order four-tuple and incrementing the initialized state code; and concatenating source address, target device address, source port and target device port fields of the RST packet in a first order four-tuple and incrementing the incremented state code into an alert value.

11. The program product of claim 10 further including a fourth set of instructions which, when executed on the computer, causes the computer to detect the next sequential SYN/ACK packet by matching a look-up table key source address to the SYN/ACK source address field.

12. The program product of claim 11 further including a fifth set of instructions which, when executed on the computer, causes the computer to purge the state code upon a lapse of the purge time period.

13. The program product of claim 12 further including a sixth set of instructions which, when executed on the computer, causes the computer to block future packets comprising the source address, the target device address and a target device port address.

14. The program product of claim 12 further including a seventh set of instructions which, when executed on the computer, causes the computer to rate-limit flows of packets comprising the source address.

* * * * *